Sept. 2, 1969     J. K. GALLION     3,464,295

DRILLING DEVICE

Filed Aug. 29, 1966     2 Sheets-Sheet 1

INVENTOR
JACQUE K. GALLION

ATTORNEY

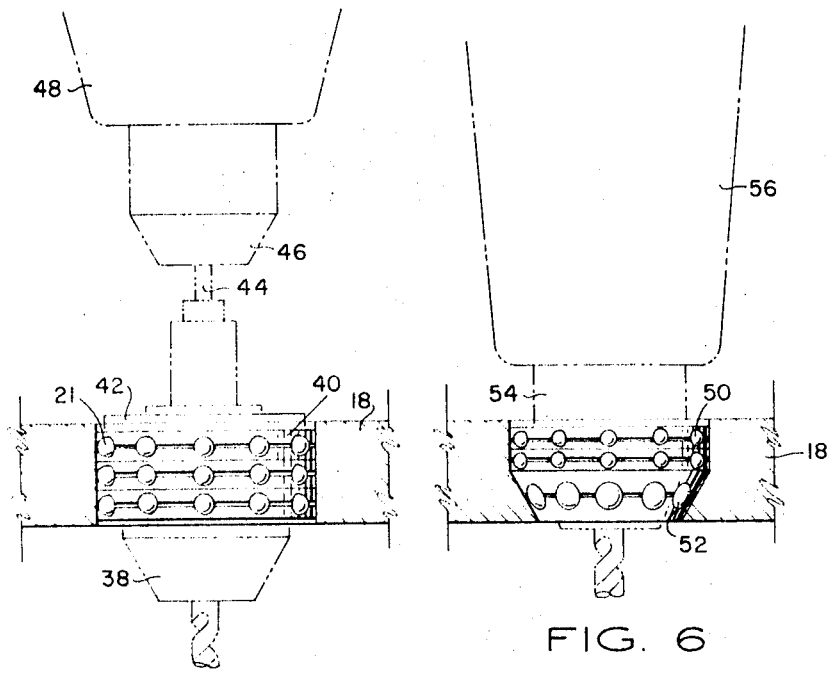
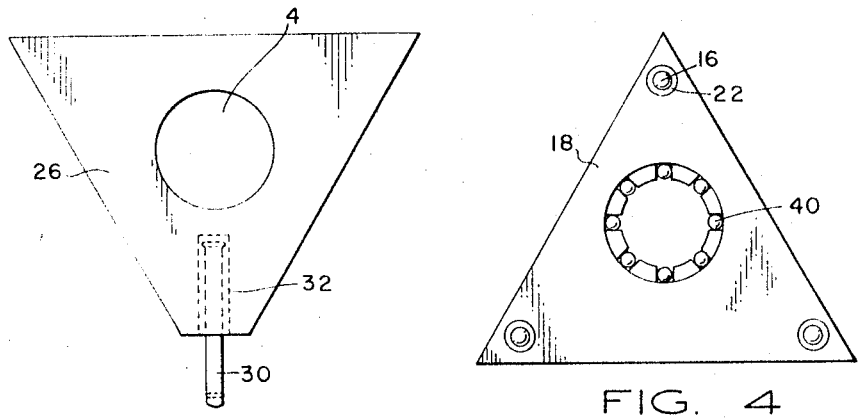

United States Patent Office 3,464,295
Patented Sept. 2, 1969

3,464,295
DRILLING DEVICE
Jacque K. Gallion, 1410 S. Oak Cliff Blvd.,
Dallas, Tex. 75208
Filed Aug. 29, 1966, Ser. No. 575,740
Int. Cl. B23b 47/28
U.S. Cl. 77—55                                6 Claims

ABSTRACT OF THE DISCLOSURE

A drilling device for use with a hand drill including a base for resting on a workpiece, a drill holding member including bearings for supporting a drill for rotation about an axis perpendicular to the base, means supporting the drill holding member for movement perpendicular to the base and a plate member contiguous with the underside of the base and pivotally and extendably connected to the base such that the distance and angle between the plate member and the base can be varied.

---

This invention relates to a drilling device and more particularly to a compact assembly to be used in conjunction with a power hand drill to aid in maintaining the path of the drill through the workpiece.

There are many instances when it is desirable to drill a straight hole perpendicular or at an angle to a workpiece, in which it is impractical, inconvenient, or impossible to use a drill press due to the inaccessability or demeanor of the workpiece. For example, it is impractical, if not impossible, to use a drill press to drill an angular hole in a wall or ceiling or within a small enclosure. It is the principal object of this invention to provide a simple, inexpensive device which may be readily used in conjunction with a hand drill to drill straight holes in a workpiece and which may be easily used for drilling at various positions and angles of drilling. An additional object of this invention is the provision of a device having the features as just described wherein a small workpiece may be held securely to prevent its rotation during the drilling operation.

In accordance with this invention, a device is provided which is readily adaptable to a hand drill. The device has a base for resting on a workpiece, means for holding a drill in a fixed position and means for biasing the drill away from the workpiece whereby pressure must be applied to the rear or handle of the drill to cause it to move to and engage the workpiece. The base includes a hole or opening for allowing a drill bit to pass through to a workpiece. A plate member also including an opening is hingedly attached at one side to one side of the base in such a manner that the angle of the device relative to a workpiece may be varied. The base has three upright tubular members perpendicularly attached to the top of it and spaced about the periphery of the hole. A drill holding member is slideably attached to the tubular members and springs are provided to bias the drill holding member away from the base and against stops which are provided on the upward end of the tubular members. Thus, a hand drill positioned in the drill holding member will be biased to a first position away from the workpiece. To drill a hole in a workpiece upon which the device is situated, pressure must be applied to the back of the drill in order to overcome the biasing effect of the springs and allow the drill bit to pass through the holes in the base and plate member and engage the workpiece.

The means for hingedly attaching the plate member to the base are rods which are extendably included in the upright tubular members and extend through the base. To enable the angle between the plate member and the base to be varied, it is necessary that at least one of the rods is extendably connected to the plate member. The means for extendably connecting the rod to the plate member consist of a short rod included within the plate member and hingedly connected to that rod. Thumbscrews, or the like, are provided which go through the base and tubular member to bear upon the rods included therein, thus firmly supporting them at the desired extension. As a result of this configuration, the rod extendably connected to the plate member may be extended to position the device in such a manner as to enable the device to drill angular holes. A second advantage of this configuration is that all of the rods may be extended uniformly and a small workpiece inserted and held between the base and plate member. In the preferred embodiment of the device a drill chuck having a shank is releasably included in the drill holding member. Bearings are provided between the chuck of the drill and the drill holding member to allow it to rotate about an axis perpendicular to the base and passing through the opening included therein. In a second embodiment of the device the drill holding member includes a combination of bearings or the like, which are adapted to conform to the outline of the chuck of a standard power drill. The bearings act to position the drill for rotation about an axis perpendicular to the base and passing through the hole included therein.

The novel features believed characteristic of this invention are set forth in the appended claims. The invention itself, however, as well as further objects and advantages thereof will best be understood by reference to the following detailed description read in conjunction with the accompanied drawings, wherein:

FIGURE 3 is a plan view of the base;

FIGURE 4 is a plan view of the drill holding member and bearings included therein:

FIGURE 5 is a fragmentary enlarged vertical section showing the bearings adaptable for a releasably mounted drill chuck; and FIGURE 6 is a fragmentary enlarged vertical section showing the bearings adaptable to the chuck of a standard size power drill.

Figure 1:
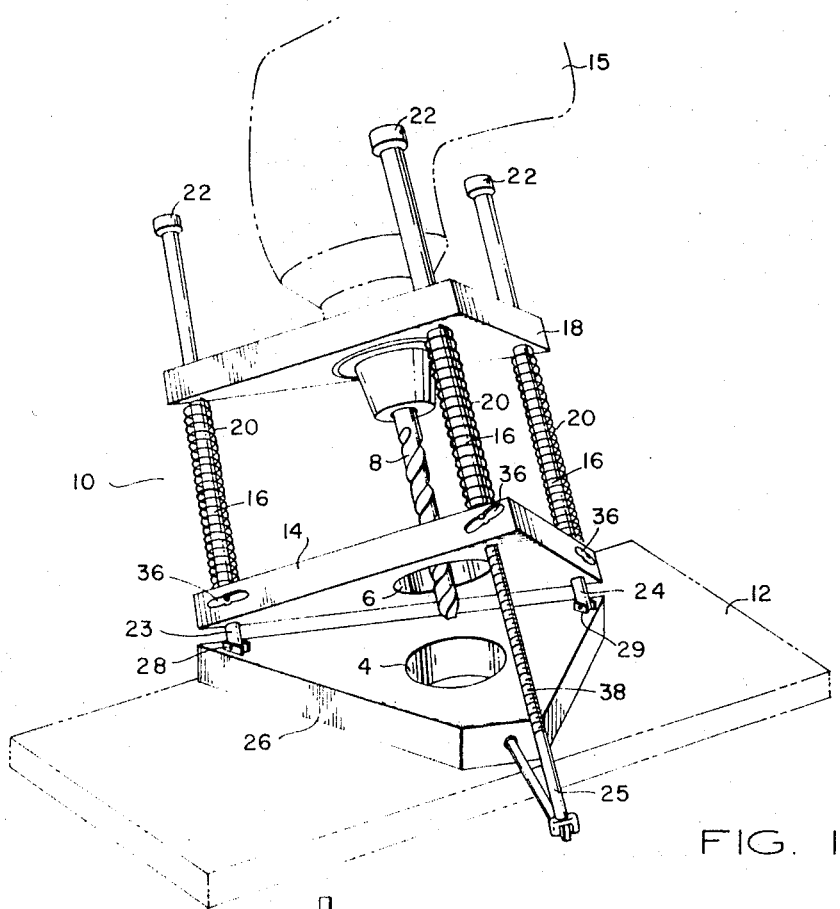
FIGURE 1 is a pictorial view of the device of the present invention showing it resting on a workpiece and set for drilling an angular hole.

Referring now more specifically to the drawings, the numeral 10 denotes the present device generally. The device 10 is shown in FIGURE 1 resting on a workpiece 12 in a tilted position for drilling angular holes. A power hand drill 15 is positioned in the device 10 in the manner in which it would normally be used. The device 10 includes a base 14 having a hole 6 in it for the purpose of allowing a drill bit 8 mounted in the drill 15 to pass through the base to engage the workpiece 12. A plate member 26 having a hole 4 included therein is hingedly attached to the base 14 so that the angle of the apparatus 10 and consequently the drill 15 and drill bit 8 relative to the workpiece 12 may be varied. The base 14 has three upright tubular members 16 attached perpendicularly to it to support the drill holding member 18 which is slideably attached to them. It should be noted at this point that the number of tubular members could be varied and that the choice of three of this embodiment is only for the purpose of illustration. Each tubular member 16 has an enlarged end or stop 22 provided at its upper end. Springs 20 encircle the tubular members 16 and serve to bias the drill holding member 18 at a position against the stops 22 whereby a drill 15 positioned in the member 18 will be at a first position above the workpiece 12.

Figure 2:
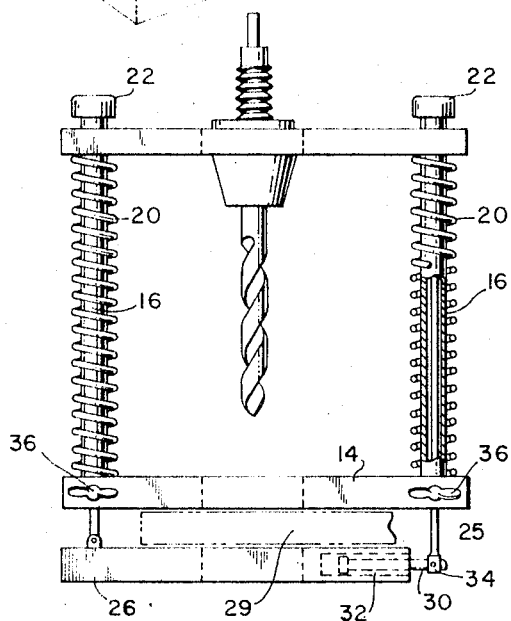
FIGURE 2 is a side elevation partially in cross section showing the device having a workpiece between the base and plate member.

As may be seen in FIGURES 1 and 2, rods 23, 24 and 25 are included within the tubular member 16 and extend below the base 14 to pivotally connect to the plate member 26. Rods 23 and 24 pivotally connect to one side of the plate member 26 by hinges 28 and 29 and rod 25 pivotally connects to a fourth rod 30 at hinge 34. The rod 30 is included in a hole 32 in the plate member 26, the hole 32 being on the side of the plate member 26 opposite that where rods 23 and 24 pivotally connect to it. The hole 32 extends into the plate member 26 perpendicular to the opposite side. The rod 30 is extendable within the hole 32 so that the angle of the plane of the base 14 and plate member 26 may be varied as shown in FIGURE 1. Thumbscrews 36 are provided to bear upon the rods 23, 24 and 25 and hold them at varying lengths of extension through the base 14 such that the angle of drilling may be adjusted as shown in FIGURE 1 by tilting the device and extending rod 25 further through the base which consequently causes rod 30 to extend within the hole 32. Rod 25 preferably includes calibrations 38 to aid in determination of the drilling angle. A further advantage of this device is that all of the rods 23, 24 and 25 may be extended uniformly as shown in FIGURE 2 such that a workpiece 29 can be held securely between the base 14 and plate member 26.

As may be seen in FIGURE 5, a drill chuck 38 may be releaseably mounted in the drill holding member 18 be means of a flange 42. The drill chuck 38 is held in position for rotation about the drilling axis which is perpendicular to the plane of the base 14 and passes through the openings 4 and 6 by means of bearings 40 and flange 42. The drill chuck 38 has a shank 44, which is sized to fit a hand drill 48, extending upward along its line of rotation. Thus, to use this particular embodiment of the device, it is necessary to first position a drill bit in the releaseable drill chuck 38 and then attach the hand drill 48 to the shank 44. In a second embodiment of the device, shown in FIGURE 6, the drill holding member 18 includes a combination of roller bearings 50 and tapered bearings 52 adapted to conform to the outline of the chuck 54 of a standard size hand drill which is denoted here by the numeral 56. It should be noted at this point that this embodiment would be adapted easily to fit almost any type of hand drill, either powered or nonpowered, by changing the size of the opening in the drill holding member 18 and the size and configuration of the bearing included therein. To operate the device of the second embodiment it is simply necessary to position the hand drill such that the chuck is centered in the bearings 50 and 52 and by applying pressure to the rear of the handle of the drill 56 causing the drill holding member 18 to slide downward which in turn causes the drill bit included in the drill to pass through the opening 4 and engage the workpiece 12.

To operate the device of the first embodiment of the present invention a hand drill is attached to the shank of the drill chuck included in the device and a bit is secured in the chuck. If an angular hole is desired, the angle of the plate member relative to the base is adjusted by reference to the calibrated scale on the third rod. The thumbscrew holding that rod is loosened and the rod extended until the desired angle is shown on the calibrated scale. The thumbscrew is then tightened and the device is placed on the workpiece or the area where the hole is to be drilled. Pressure is applied to the rear of the drill to overcome the biasing effect of the springs. The bit will then pass through the holes in the base and plate member and engage the area to be drilled. Operation of the second embodiment is similar to that of the first, except there is no drill chuck included in the device and therefore the chuck of the drill to be used is positioned in the holding member with the bearings securing it for rotation about an axis perpendicular to the base.

While the drilling device of this invention has been described with reference to particular embodiments, it is of course understood that this description is not to be construed in a limiting sense. Other embodiments of the invention, as well as modifications of the disclosed embodiments will be apparent to persons skilled in the art upon reference to this specification. It is therefore contemplated that the appended claims will cover any such modifications or embodiments as fall within the true scope of this invention.

What is claimed is:

1. A drilling device readily adaptable to a simple hand drill to aid in drilling straight holes comprising:
    (a) a base having a top and bottom and including a large opening, said base being suitable for resting on a workpiece;
    (b) a drill holding member including bearing means for supporting a drill for rotation about an axis passing through said opening and perpendicular to said base;
    (c) means supporting said drill holding member for movement perpendicular to the base with the drill holding member being variable between a first position in which a bit carried by said drill is positioned above the workpiece and a second position where said drill engages the workpiece;
    (d) means biasing said drill holding member to the first position; and
    (e) a plate member contiguous with the bottom of the base and hingedly connected to the base member on one side and extendably connected on the other side such that the angle formed by the plane of the plate member and the base may be varied.

2. A drilling device as defined in claim 1 wherein said plate member is pivotally and extendably connected to the base such that the distance and the angle between the plate member and the base can be varied.

3. A drilling device readily adapted to simple hand drills to aid in drilling straight holes comprising:
    (a) a base member including an enlarged opening, said base member to be suitable for resting on a workpiece;
    (b) a drill holding member including bearing means for supporting a drill for rotation about an axis pasing through said opening and perpendicular to said base;
    (c) means supporting said drill holding member for movement perpendicular to the base whereby the spacial relationship between the base and the drill holding means is variable between a first position in which a bit carried by said drill is positioned above a workpiece and a second position where said bit engages the workpiece, said suporting means to include at least three tubular members attached to the base with the drill holding member being slidably attached to said tubular member;
    (d) a plate member contiguous with the bottom of the base;
    (e) rods included in two of said tubular members to pass through said base and hingedly attached to one side of said plate member; and
    (f) a third rod included in said third tubular member to pass through the base and pivotally and extendably connect to said plate member on the side opposite the said one side, such that a workpiece may be held between the base and plate member or may be positioned beneath the plate member.

4. The drilling device defined in claim 3 where said rods are movable within said tubular members and wherein screw means are provided for holding said rods at various positions within said tubular members.

5. The drilling device defined in claim 4 wherein said plate member includes a hole extending inward from said opposite side of said plate member parallel to the plane of said plate member, and said hole having a rod member extendably included therein with the outward end of said rod member being pivotally attached to the lower end of said third rod.

6. The drilling device defined in claim 5 wherein said drill holding member includes a drill chuck releasably mounted therein, said drill chuck having a shank suitable for attaching the chuck to a hand drill.

References Cited

UNITED STATES PATENTS

| | | | |
|---|---|---|---|
| 2,454,372 | 11/1948 | Billeter | 77—55 |
| 2,622,458 | 12/1952 | Jenkins | 77—55 |
| 2,997,900 | 8/1961 | Pugsley | 77—7 |
| 2,953,045 | 9/1960 | Carles | 77—31 X |

FOREIGN PATENTS 557,254    11/1943    Great Britain.

FRANCIS S. HUSAR, Primary Examiner

U.S. Cl. X.R.

77—31